United States Patent
Jaradi et al.

(10) Patent No.: US 10,246,138 B2
(45) Date of Patent: Apr. 2, 2019

(54) LATCH MECHANISM FOR AN OPENABLE BOX SIDE OF A PICKUP TRUCK

(71) Applicant: Ford Global Technologies, LLC, Dearborn, MI (US)

(72) Inventors: Dean M. Jaradi, Macomb, MI (US); S. M. Iskander Farooq, Novi, MI (US); Mohammed Omar Faruque, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 278 days.

(21) Appl. No.: 15/272,812

(22) Filed: Sep. 22, 2016

(65) Prior Publication Data

US 2018/0079455 A1 Mar. 22, 2018

(51) Int. Cl.
| | |
|---|---|
| *B62D 33/03* | (2006.01) |
| *B62D 33/037* | (2006.01) |
| *B62D 33/027* | (2006.01) |
| *E05B 83/22* | (2014.01) |
| *E05B 85/04* | (2014.01) |
| *E05B 83/16* | (2014.01) |
| *E05B 63/00* | (2006.01) |

(52) U.S. Cl.
CPC ......... *B62D 33/037* (2013.01); *B62D 33/027* (2013.01); *B62D 33/0273* (2013.01); *E05B 83/16* (2013.01); *E05B 83/22* (2013.01); *E05B 85/04* (2013.01); *E05B 2063/0026* (2013.01)

(58) Field of Classification Search
CPC . B62D 33/037; B62D 33/027; B62D 33/0273
USPC ................................ 296/186.4, 183.1, 186.5
See application file for complete search history.

(56) References Cited

U.S. PATENT DOCUMENTS

| | | | |
|---|---|---|---|
| 4,861,096 A | 8/1989 | Hastings | |
| 6,030,018 A | 2/2000 | Clare et al. | |
| 6,460,915 B1 * | 10/2002 | Bedi | B60J 5/0498 |
| | | | 296/151 |
| 7,059,666 B2 | 6/2006 | Harrison | |
| 9,027,984 B2 * | 5/2015 | Bates | B62D 33/04 |
| | | | 296/186.4 |
| 9,511,803 B2 * | 12/2016 | Wassell | B62D 33/03 |
| 2005/0093339 A1 | 5/2005 | Klassen | |
| 2009/0127886 A1 * | 5/2009 | Stortzum | B60J 5/0497 |
| | | | 296/146.1 |

* cited by examiner

*Primary Examiner* — Joseph D. Pape
(74) *Attorney, Agent, or Firm* — Jason C. Rogers; Brooks Kushman P.C.

(57) ABSTRACT

A vehicle includes a box extending from a cab and including a floor and a first sidewall attached to a headboard, via a hinge assembly, disposed normal to the floor and sidewall. The hinge assembly is configured to allow the first sidewall to rotate away from the floor at the headboard. The vehicle also includes a latch mechanism. The latch mechanism includes a pin having an end and a shaft attached to the first sidewall and a receiver having a plate hingedly connected to the receiver. Upon rotation of the first sidewall toward the floor, the end fits into the receiver and the plate locks the shaft to secure the first sidewall to the floor.

10 Claims, 4 Drawing Sheets

LATCH MECHANISM FOR AN OPENABLE BOX SIDE OF A PICKUP TRUCK

TECHNICAL FIELD

The present disclosure relates to latch mechanisms for securing a rotating box side of a pickup truck bed.

BACKGROUND

Certain vehicles, such as trucks, include a box which extends from a cab. The box is typically open and includes a bed that may be used for storage. The bed may be long, making it difficult to reach, load or unload items within the box. Storage containers are available that fit within the box on the bed against a headboard. The storage containers may also extend between sidewalls of the box to divide an area defined by the bed. Being disposed against the headboard, the storage containers may also be difficult to reach.

SUMMARY

A bed for a truck includes a first side extending perpendicular from a floor. The first side includes a hinge that attaches the first side to a headboard. The first side is configured to rotate away from the floor via the hinge such that a bottom edge of the first side and an edge of the floor are spaced apart. The bed also includes a latch mechanism. The latch mechanism includes a pin attached to a first end of the first side and a receiver configured to receive the pin attached to a cross member support for the floor. The receiver secures the pin such that the latch mechanism is configured to lock the first side to the floor.

A latch mechanism for a hinged side of a truck bed includes a pin. The pin has a shaft and a spherical end. The latch mechanism also includes a receiver formed on an end of a cross member. The receiver is configured to receive the end of the pin. The receiver includes a plate to engage, after insertion of the pin into the receiver, the pin at the shaft to pull the spherical end.

A vehicle includes a box extending from a cab and including a floor and a first sidewall attached to a headboard, via a hinge assembly, disposed normal to the floor and sidewall. The hinge assembly is configured to allow the first sidewall to rotate away from the floor at the headboard. The vehicle also includes a latch mechanism. The latch mechanism includes a pin having an end and a shaft attached to the first sidewall and a receiver having a plate hingedly connected to the receiver. Upon rotation of the first sidewall toward the floor, the end fits into the receiver and the plate locks the shaft to secure the first sidewall to the floor.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
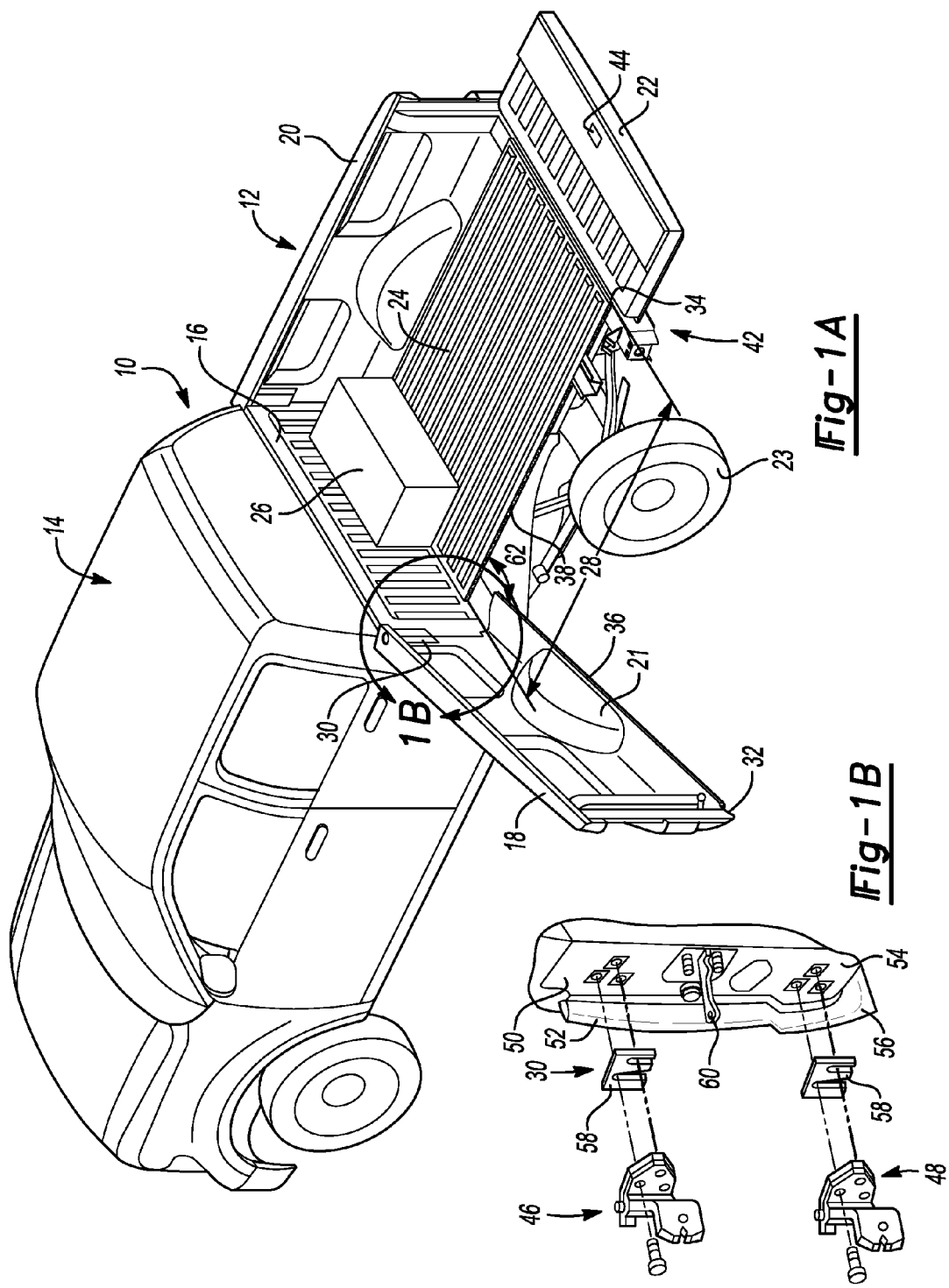
FIG. 1A is a perspective view of a vehicle with a box having a sidewall rotating at a headboard and away from the floor of the box.
FIG. 1B is an exploded perspective view of the sidewall and headboard taken from section 1A of FIG. 1.

Referring to FIG. 1A and FIG. 1B, a perspective view of a vehicle 10 having a box 12 extending from a cab 14 is shown. The box 12 is attached to the cab 14 at a headboard 16. The box 12 is defined by a first sidewall 18 and a second sidewall 20. The first and second sidewalls 18, 20 extend perpendicularly from the headboard 16 to a tailgate 22. The tailgate 22 is disposed parallel to the headboard 16. A bed 24 extends between the first and second sidewalls 18, 20 as well as between the headboard 16 and the tailgate 22. A load 26 may be stored within the box 12 on the bed 24 between the first and second sidewalls 18, 20 and the headboard 16 and tailgate 22. When the load 26 is stored on the bed 24 within the box 12, the load 26 may be difficult to access. If the load 26 is difficult to access, it may be difficult to remove the load 26 from the box 12.

Typically, access to the box 12 is through the tailgate 22. Therefore, in order to remove the load 26 from the bed 24, the load 26 must be moved across the bed 24 from the headboard 16 out the tailgate 22. Removing the load 26 across the bed 24 and out the tailgate 22 may be a laborious task, especially if the load 26 is large and heavy. For example, the tailgate 22 and the bed 24 may make it difficult to reach the load 26 as well as to slide or lift the load 26 across the bed 24 to remove the load 26 from the box 12. A box 12, which allows for access to the load 26 across a length 28 of the bed 24, may be advantageous. The box 12 may allow access to the load 26 through the first sidewall 18 or the second sidewall 20. As detailed below, the first sidewall 18 may be described as rotating at the headboard 16 away from the bed 24. However, the second sidewall 20 may also be configured to rotate at the headboard 16 away from the bed 24. Rotation of the first or second sidewall 18, 20 may depend on a location of a fuel tank inlet (not shown). For example, the first sidewall 18 may be configured to rotate if the second sidewall 20 includes the fuel tank inlet and the second sidewall 20 may be configured to rotate if the first sidewall 18 includes the fuel tank inlet. Likewise, a wheel well 21 typically formed on the first or second sidewalls 18, 20 may be formed to allow the first or second sidewalls 18, 20 to rotate. The wheel well 21 may be configured to cover the wheel 23 when the first or second sidewall 18, 20 is locked against the bed 24.

In the embodiment shown in FIG. 1A, the box 12 may include a first sidewall 18 that rotates at the attachment between the first sidewall 18 and the headboard 16. As will be described in more detail below, a hinge assembly 30 may interconnect the first sidewall 18 and the headboard 16 to allow the first sidewall 18 to rotate away from the bed 24. Rotating the first sidewall 18 allows access to a load 26 along an entirety of the length 28 of the bed 24. Providing access along the length 28 of the bed 24 provides easier access to load 26 in order to remove the load 26 from the box 12 without requiring the load 26 to be removed via the tailgate 22. Further, by allowing rotation of the first sidewall 18, access to the load 26 may be easier without diminishing the storage capacity of the box 12. Maintaining the storage capacity of the box 12 while providing easy access to loads 26 within the box 12 via the rotating first sidewall 18 may be advantageous when the vehicle 10 is storing larger or heavier items within the box 12. The rotating first sidewall 18 provides a quick, simple and efficient mechanism for loading and unloading load 26 into the box 12 and onto the bed 24 of the vehicle 10.

The first sidewall 18 may further include a bottom edge 32 and the bed 24 may further include an edge 34. When the first sidewall 18 rotates away from the bed 24 via the hinge assembly 30 at the headboard 16, the bottom edge 32 of the first sidewall 18 rotates away from the edge 34 of the bed 24 such that the bottom edge 32 is spaced apart from the edge 34 of the bed 24. Separation between the bottom edge 32 of the first sidewall 18 and the edge 34 of the bed 24 provides access to the bed 24 along the length 28 of the bed 24. Rotation of the first sidewall 18 away from the bed 24 exposes the first sidewall 18 and the bed 24. Exposure of the first sidewall 18 and the bed 24 may result in corrosion or dirt buildup on either the first sidewall 18 or the bed 24. Corrosion and dirt buildup on the first sidewall 18 or the bed 24 may cause deterioration of the box 12.

To account for corrosion and dirt buildup on the first sidewall 18 and the bed 24, the box 12 may further include first and second seals 36, 38. The first and second seals 36, 38 may be disposed on the bottom edge 32 of the first sidewall 18 and the edge 34 of the bed 24. The first and second seals 36, 38 may be commonly used weather seals such as foam adhered to the bottom edge 32 and the edge 34, respectively. In at least one other embodiment, the first and second seals 36, 38 may be plastic, rubber, or any other material or coating commonly used to prevent corrosion on the first sidewall 18 and the bed 24. The first and second seals 36, 38 may be configured to mate. For example, when the first sidewall 18 rotates toward the bed 24 to secure the first sidewall 18 against the bed 24, the first seal 36 disposed at the bottom edge 32 of the first sidewall 18 compresses against the second seal disposed at the edge 34 of the bed 24 creating a tight closure between the first sidewall 18 and the bed 24 of the box 12. The tight closure between the first sidewall 18 and the bed 24, via the first and second seals 36, 38, prevents water or any other electrolytic fluid as well as dirt and other contaminants from intruding into the box 12, and specifically the first sidewall 18 and the bed 24.

As will be described in more detail below, the first sidewall 18 uses a latch mechanism 42 to create the tight closure between the bottom edge 32 of the first sidewall 18 and the edge 34 of the bed 24. When the first sidewall 18 is secured against the bed 24, the first sidewall 18 is in a closed or latched position. Likewise, when the first sidewall 18 is rotated away from the bed 24, the first sidewall 18 is in an open or unlatched position. The box 12 may further include a second latch mechanism 44 interconnecting the first sidewall 18 and the tailgate 22. The second latch mechanism 44 may be a traditional latch mechanism 44 interconnecting the first and second sidewalls 18, 20 and the tailgate 22. The second latch mechanism 44 is also configured to allow the tailgate 22 to disconnect from the first and second sidewalls 18, 20 and rotate to a position parallel to the bed 24 as is commonly found on vehicle 10 utilizing a box 12.

The second latch mechanism 44 is unlocked when the tailgate 22 is rotatable to the position parallel with the bed 24 and is locked when the tailgate 22 is perpendicular to the bed 24. In order to secure the first sidewall 18 against the bed 24 in the latched position, the second latch mechanism 44 should be unlocked such that the tailgate is defined as down. The first sidewall 18 may only be rotated when the second latch mechanism 44 is unlocked such that the tailgate is defined as down. Stated differently, after the second latch mechanism 44 is locked, the first sidewall 18 may be secured against the bed 24 and when the second latch mechanism 44 is unlocked, the first sidewall 18 may be rotated away from the bed 24. Therefore, the second latch mechanism 44 may be used in addition to the latch mechanism 42 to seal the first sidewall 18 against the bed 24. More specifically, the second latch mechanism 44 may be used to seal the bottom edge 32 of the first sidewall 18 to the edge 34 of the bed 24.

FIG. 1B depicts an exploded perspective view of the hinge assembly 30 interconnecting the first sidewall 18 and the headboard 16 that allows the first sidewall 18 to rotate at the headboard 16 and away from the bed 24. The hinge assembly 30 includes first and second hinges 46, 48. The first hinge 46 may be disposed and interconnect an upper portion 50 of the headboard 16 and an upper portion 52 of the first sidewall 18. Likewise, the second hinge 48 may be disposed and interconnect a lower portion 54 of the headboard 16 and a lower portion 56 of the first sidewall 18. The first and second hinges 46, 48 may be fastened to the sidewall 18 and headboard 16. In at least one other embodiment, the first and second hinges 46, 48 may be bonded, adhered, welded or otherwise secured to the first sidewall 18 and headboard 16.

The first and second hinges 46, 48 may be spaced apart using a hinge spacer 58. The hinge spacer 58 ensures that there is an appropriate amount of space between the first and second hinges 46, 48. Spacing the first and second hinges 46, 48 allows the hinge assembly 30 to divide the overall weight of the first sidewall 18 between the first and second hinges 46, 48. Dividing the weight of the first sidewall 18 between the first and second hinges 46, 48 provides durability to the hinge assembly 30 and ensures that the hinge assembly 30 is capable of rotating the first sidewall 18 away from the bed 24. In at least one other embodiment, the hinge assembly 30 may only include the first hinge 46. Likewise, a further embodiment, the hinge assembly 30 may include more than the first and second hinges 46, 48 depending on the weight of the first sidewall 18. The number of hinges within the hinge assembly 30 may also vary according to vehicle size and type. For example a smaller vehicle 10 may require only the first hinge 46 while a larger vehicle, such as a commercial truck, may require more than two hinges. Again, the number of hinges within the hinge assembly 30 may be based on the overall weight of the first sidewall 18.

The hinge assembly 30 further includes a hinge check 60. As described above, the hinge assembly 30 allows the first sidewall 18 to rotate away from the bed 24. The hinge check 60 is configured to control a swing angle 62 of the first sidewall 18. The hinge check 60 limits the swing angle 62 of the first sidewall 18 to further improve durability of the hinge assembly 30. For example, if the swing angle 62 of the first sidewall 18 extends such that the first sidewall 18 is substantially in line with the headboard 16, the hinge assembly 30 may be damaged. The hinge check 60 may be designed such that for an optimal swing angle 62 the first sidewall 18 allows the load 26 to be removed from the box 12. The hinge check 60 may also be configured to maintain rotation of the first sidewall 18 through a range of swing angles 62. Allowing the first sidewall 18 to rotate within a range of swing angles 62, the hinge check 60 allows the rotating first sidewall 18 to be used within a variety of situations. For example, it may be advantageous to rotate the first sidewall 18 to access a smaller load 26 on the bed 24 within a smaller swing angle 62 to maintain a position of larger loads 26 also disposed on the bed 24. Likewise, a larger swing angle 62 may be needed for larger loads 26 and the hinge check 60 may be configured to effectuate rotation of the first sidewall 18 at the larger swing angle 62 for the larger loads 26.

Figure 2:
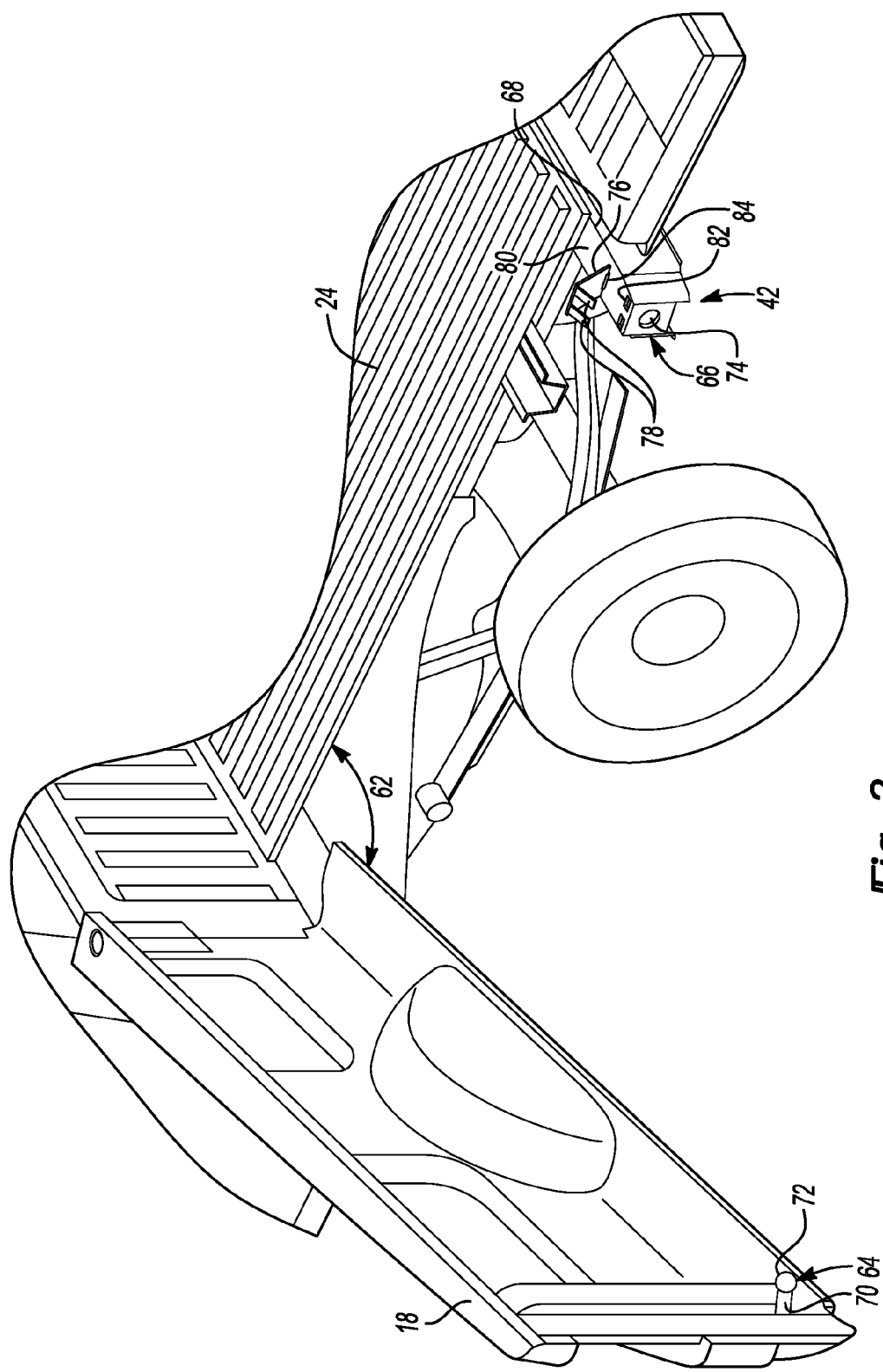
FIG. 2 is a perspective view of a vehicle box having a latch mechanism that secures the sidewall to the floor of the box.

FIG. 2 depicts a perspective view of the first sidewall 18 rotated at the swing angle 62 and including the first latch mechanism 42. The first latch mechanism 42 may be a locking pin type latch mechanism 42. Further, the first latch mechanism 42 may be actuated after the second latch mechanism 44 is locked. Therefore, the first latch mechanism 42 locks the first sidewall 18 to the bed 24 when the first sidewall 18 is in the locked position, as described above. Actuation of the first latch mechanism 42 will be discussed in more detail below. The first latch mechanism 42 includes a pin 64 and a receiver 66. The pin 64 is fixedly attached to the first sidewall 18 and the receiver 66 is defined in a cross member support 68, which is disposed underneath and supports the bed 24. The pin 64 may be formed with the first sidewall 18, welded to the first sidewall 18, fastened to the first sidewall 18, adhered or bonded to the first sidewall 18 or permanently attached in any other way to the first sidewall 18. The pin 64 further includes a shaft 70 and an end 72. The receiver 66 defines a bore 74 within the cross member 68 that receives the end 72. The receiver 66 further includes a plate 76 configured to lock the pin 64 within the receiver 66.

Figure 3:
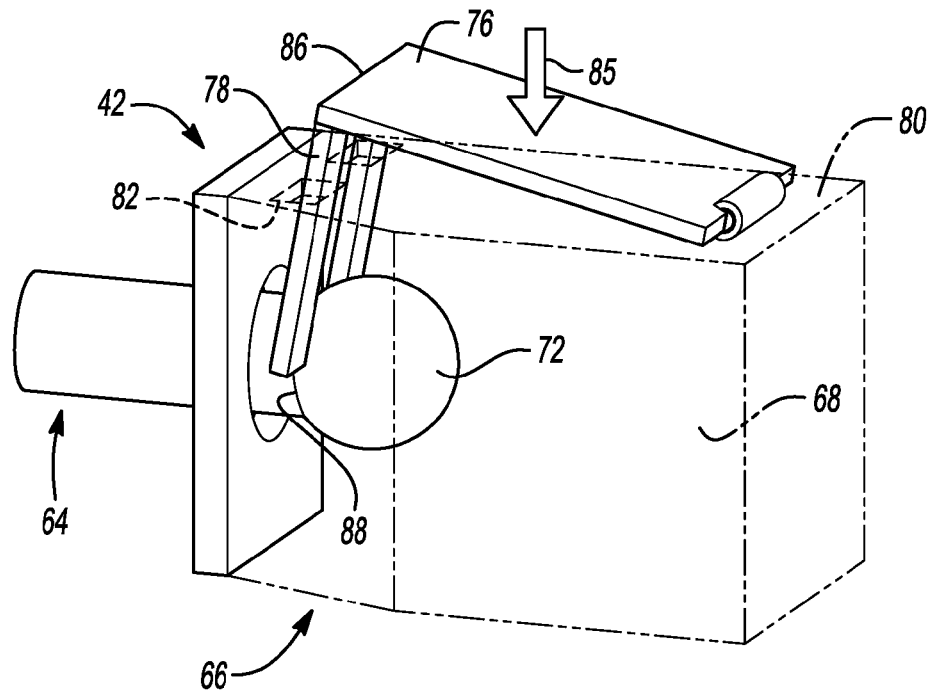
FIGS. 3-5 are perspective views of operation of the latch mechanism.

The end 72 of the pin 64 may define a spherical shape. In at least one other embodiment, the end 72 of the pin 64 may define a substantially cubic, pyramidal, frustoconical or any other shape designed to aid in latching the first sidewall 18 to the bed 24. The end 72 of the pin 64 fits within the bore 74 defined within the cross member 68 and engages the plate 76. The plate 76 may define at least two legs 78. The plate 76 is disposed on an upper surface 80 of the cross member 68 and the legs 78 are configured to fit within corresponding slits 82 defined on the upper surface 80 of the cross member 68. FIG. 3 depicts the plate 76 having at least two legs 78. However, in at least one other embodiment, the plate 76 may use a single leg 78, or a plurality of legs 78 to engage and lock the pin 64 within the receiver 66. As will be described in more detail below, after the pin 64 is inserted into the receiver 66, the plate 76 engages the pin 64 via the legs 78. Specifically, the legs 78 engage the shaft 70 of the pin 64 to lock the pin 64 within the receiver 66.

The plate 76 may be hingedly disposed on the upper surface 80 of the cross member 68. Being hingedly disposed on the upper surface 80 of the cross member 68 allows the plate 76 and specifically the legs 78 to move in and out of the slits 82 defined on the cross member 68. For example, the plate 76 rotates in a direction normal to the upper surface 80 of the cross member 68 via a hinge 84. This allows the plate 76 to engage the shaft 70 of the pin 64 during insertion of the pin 64 into the receiver 66. Specifically, the hinge 84 allows at least two legs 78 of the plate 76 to move allowing the end 72 of the pin 64 to fit within the bore 74 of the receiver 66 such that the plate 76 rotates and the legs 78 fit into the slits 82 and engage the shaft 70 after the end 72 of the pin 64 moves beyond the legs 78 within the receiver 66. In this way, the plate 76 locks the pin 64 into the receiver 66 and secures the first sidewall 18 to the bed 24. Therefore, the first latch mechanism 42 is configured to secure the first sidewall 18 to the bed 24 via the plate 76.

Figure 4:
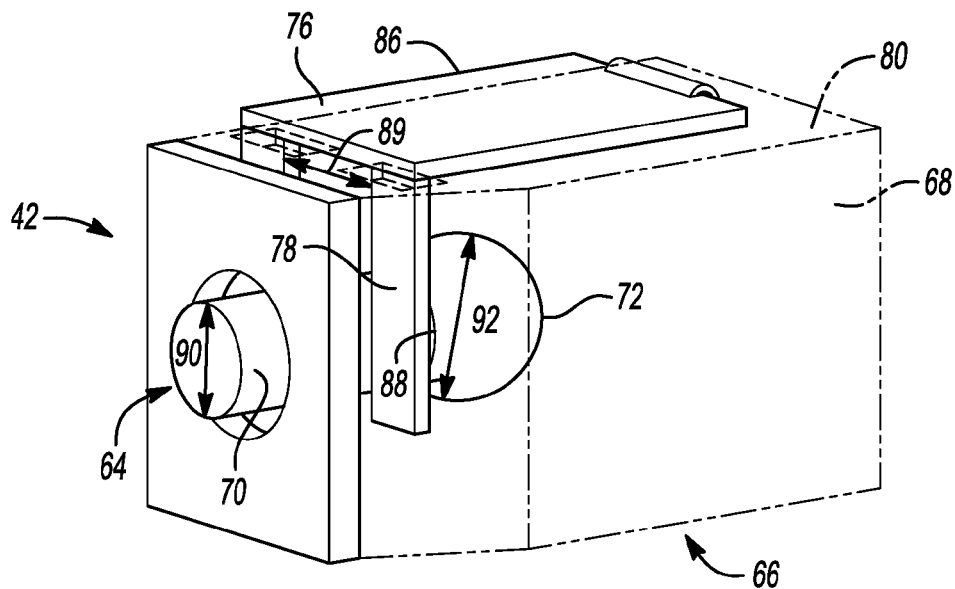
Figure 5:
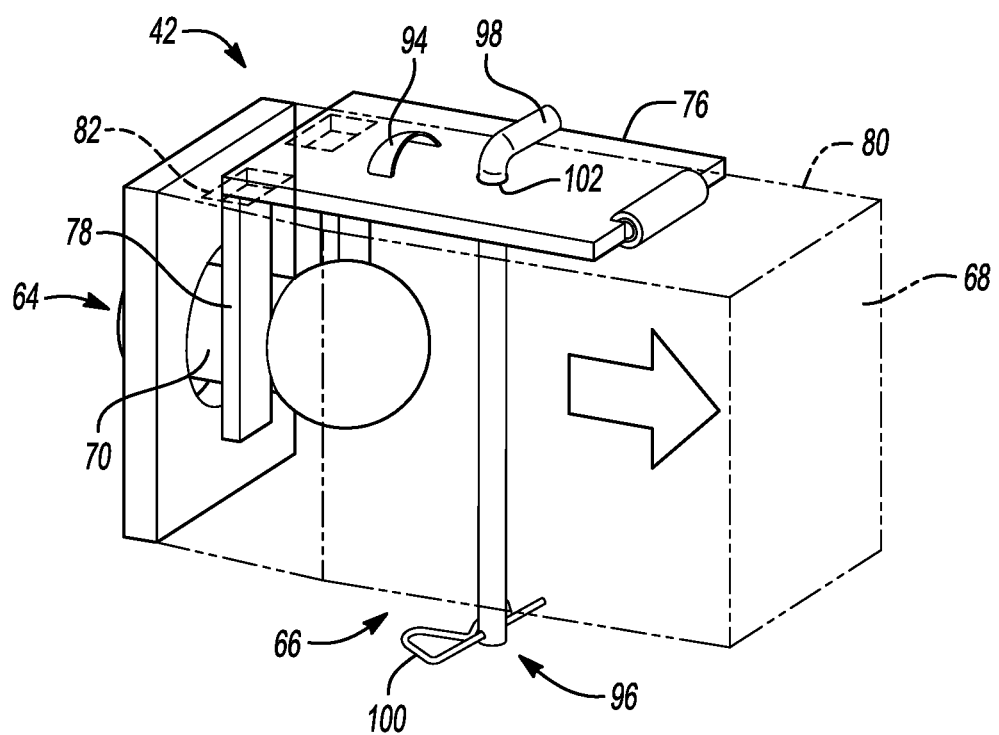

Referring to FIGS. 3-5, actuation of the latch mechanism 42 is detailed using perspective views of the latch mechanism 42 including the pin 64, the receiver 66 and the plate 76. FIGS. 4-6 show actuation of the latch mechanism from an unlatched position to a latched position. And securing the latch mechanism 42 to the latched position compresses the first and second seals 36, 38 and provides a tight closure between the sidewall 18 and the tailgate 22. Tight closure between the first sidewall 18 and the bed 24 allows the box 12 to store larger loads and act as a traditional box 12 commonly found on trucks, or other vehicles, such as SUV's or commercial trucks, with a bed 24 attached to a cab 14 via a headboard 16.

Referring specifically to FIG. 3, a perspective view of the latch mechanism 42 and an initial position is depicted. Specifically, the plate 76 is shown hinged on the upper surface 80 of the cross member 68, in which the at least two legs 78 are at least partially inserted into the slits 82 of the cross member 68 and beginning engagement with the pin 64. As can be seen in FIG. 4, the at least two legs 78 initially contact the end 72 of the pin 64 to begin the latching process. The plate 76 may be configured to secure the pin 64 into the receiver 66 in response to a downward force 85 on an upper surface 86 of the plate 76. The downward force 85 applied to the upper surface 86 of the plate 76 forces the legs 78 to slide off of the spherical end 72 of the pin 64 and engage the shaft 70. Therefore, the legs 78 of the plate 76 secure the pin 64 in the receiver 66 at a portion 88 of the end 72 immediately adjacent the shaft 70 of the pin 64. In this way, the at least two legs 78 of the plate 76 force the end 72 of the pin 64 in a direction toward the bed 24 within the receiver 66 to create a tighter seal between the first and second seals 36, 38 as well as the first sidewall 18 and the bed 24.

Referring specifically to FIG. 4, a further perspective view of the latch mechanism 42 in a latched position is depicted. Specifically, the plate 76 is shown such that the upper surface 86 of the plate 76 is parallel to the upper surface 80 of the cross member 68, in which the at least two legs 78 are fully disposed and inserted within the slits 82 of the cross member 68. As can be seen in FIG. 5, when the latch mechanism 42 is in the latched position, the legs 78 of the plate 76 secure the shaft 70 of the pin 64 within the receiver 66 and pull the pin 64 further into the receiver 66 in a direction toward the bed 24 to secure the first sidewall 18 against the bed 24. As stated above, the legs 78 of the plate 76 slide off the end 72 of the pin 64. Further, the shaft 70 may define a shaft diameter 90 being less than a diameter 92 of the spherical end 72 of the pin 64. In at least one other embodiment, the end 72 of the pin 64 may define a length, width, height or any other dimension to be greater than the diameter, or width and height of the shaft 70 such that the legs 78 secure the pin 64 within the receiver 66, detailed below.

Therefore, the at least two legs 78 of the plate 76 are spaced apart at a distance 89 such that the legs 78 prevent the spherical end 72 of the pin 64 from sliding out of the receiver 66 and allowing the first sidewall 18 to rotate away from the bed 24. For example, the distance 89 between the at least two legs 78 of the plate 76 may be less than the diameter 92 of the spherical end 72 of the pin 64 and greater than the diameter 90 of the shaft 70 of the pin 64. In this way, the at least two legs 78 may engage the end 72 at the portion 88 of the end 72 immediately adjacent the shaft 70 and prevent the end 72 from moving in a direction away from the bed 24, or unlatching the first sidewall 18 and allowing the first sidewall 18 to rotate away from the bed 24, as described above. Stated differently, the distance 89 between the at least two legs 78 allows the plate 76 to secure the pin 64 within the receiver 66 to lock the sidewall 18 against the bed 24 to define the latched position of the first sidewall 18.

Referring specifically to FIG. 5, a perspective view of the latch mechanism 42 in the locked position, in which the at least two legs 78 of the plate 76 are securing the shaft 70 of the pin 64 within the receiver 66 is depicted. As described above, the distance 89 between the at least two legs 78 is such that the plate 76 pulls the pin 64, via engagement between the at least two legs 78 and the portion 88 of the end 72 immediately adjacent the shaft 70 of the pin 64, into the receiver 66. When the latch mechanism 42 is in the locked, or latched position, the at least two legs 78 may be in constant tension with the pin 64 to maintain the latched position of the first sidewall 18. For example, the at least two legs 78 may be in constant contact with the portion 88 of the end 72 immediately adjacent the shaft 70 due the compression between the first and second seals 36, 38.

When the vehicle 10 is at rest, the at least two legs 78 of the plate 76 may be configured to pull the end 72 of the pin 64 in tension toward the direction of the bed 24 being equal to the compression exerted on the first sidewall 18 via the first and second seals 36, 38 as described above. When the vehicle 10 is moving, the at least two legs 78 of the plate 76 may be configured to pull the end 72 of the pin 64 in tension toward the direction of the bed 24 being equal to the compression exerted on the first sidewall 18 via the first and second seals 36, 38 in addition to inertial forces acting perpendicularly to the first sidewall 18 in a direction away from the bed 24. Therefore, the at least two legs 78 are designed such that the at least two legs 78 define a stiffness greater than the compression forces of the first and second seals 36, 38 and the inertial forces during vehicle operation exerted on the first sidewall 18 described above without buckling or shearing from the plate 76.

The at least two legs 78 and the plate 76 may be formed integrally with a high-strength metal, such as steel. In at least one other embodiment, the at least two legs 78 may be fastened, welded, bonded or attached to the plate 76 using any other attachment method that allows the at least two legs 78 to withstand the forces described above. Likewise, in at least one other embodiment, the plate 76 as well as the at least two legs 78 may be formed using any other high-strength material, such as, but not limited to, aluminum, carbon fiber, plastic or any other material capable of withstanding the forces described above.

Also, as can be seen in FIG. 5, the plate 76 may further include a tab 94. The tab 94 may be formed on the upper surface 86 of the plate 76. The tab 94 effectuates unlatching the latch mechanism 42 to disengage the at least two legs 78 of the plate 76 from the end 72 of the pin 64 to allow the first sidewall 18 to rotate away from the bed 24 as described above. In order to unlatch the latch mechanism 42, the tab 94 may be pulled, or lifted perpendicular to the upper surface 86 of the plate 76 away from the cross member 68. Pulling the tab 94 away from the cross member 68 forces the plate 76 and the at least two legs 78 to rotate in a direction normal to the upper surface 80 of the cross member 68, as described above. Specifically, the tab 94 may be located at any position on the upper surface 86 of the plate 76, which allows the plate 76 to rotate normally to the upper surface 80 of the cross member 68 and the at least two legs 78 to slide through the corresponding slits 82 defined on the upper surface 80 of the cross member 68.

Lifting the tab 94 disengages the at least two legs 78 and relieves the tension from the at least two legs 78 on the pin 64 to allow the pin 64 to move out of the receiver 66 in order to rotate the first sidewall 18 away from the bed 24. The tab 94 may be formed integrally with the plate 76 and define a substantially circular or toroidal shape, such as a ring, which allows a force to be exerted away from the cross member 68. At least one other embodiment, the tab 94 may be welded, fastened or bonded to the upper surface 80 of the cross member 68. Further, in at least one other embodiment, the tab 94 may define a substantially curved shape to allow a force in a direction perpendicular to the upper surface 86 of the plate 76 to be exerted on the tab 94. Again, the tab 94 relieves the tension exerted on the plate 76 and unlatches the pin 64 from the receiver 66.

In order to prevent incidental or unintended unlatching of the latch mechanism 42, the latch mechanism 42 may further include a pin and clip assembly 96. The pin and clip assembly 96 secures the plate 76 to the cross member 68. The pin and clip assembly 96 may be a traditional steel pin 98 with a cotter-pin clip 100 commonly used with trailer hitches. The pin and clip assembly 96 extends through a hole 102 defined through both the plate 76 and the cross member 68. The pin 98 may be substantially L-shaped and be configured to receive the clip 100 such that the pin and clip assembly 96 resists rotation of the plate 76 in a direction away from the upper surface 80 of the cross member 68 and may be removed when the latch mechanism 42 needs to be unlatched. Again, the pin and clip assembly 96 prevents unintended or incidental unlatching of the latch mechanism, which may be due to vehicle operation, or any other unintended unlatching of the latch mechanism.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A bed for a truck comprising:
   a first side extending perpendicular from a floor and including a hinge that attaches the first side to a headboard, the first side being configured to rotate away from the floor via the hinge such that a bottom edge of the first side and an edge of the floor are spaced apart; and
   a latch mechanism including a pin attached to a first end of the first side and a receiver configured to receive the pin attached to a cross member support for the floor, wherein the receiver secures the pin such that the latch mechanism is configured to lock the first side to the floor.

2. The bed of claim 1 further comprising first and second seals disposed on the bottom edge of the first side and the edge of the floor, wherein the first and second seals are configured to compress when the first side is locked to the floor.

3. The bed of claim 1 further comprising a second latch mechanism interconnecting the first side and a tailgate such that, when the first side is locked, the second latch mechanism is configured to secure the tailgate to the first side.

4. The bed of claim 1, wherein the receiver further includes a plate having two legs configured to engage the pin along a shaft and pull an end of the pin to lock the pin within the receiver.

5. The bed of claim 4, wherein the plate is secured to the cross member support via a pin and clip assembly that extends through a hole defined on the plate and the cross member support.

6. A vehicle comprising:
a box extending from a cab and including a floor and a first sidewall attached to a headboard, via a hinge assembly, disposed normal to the floor and sidewall, wherein the hinge assembly is configured to allow the first sidewall to rotate away from the floor at the headboard; and
a latch mechanism including a pin having an end and a shaft attached to the first sidewall and a receiver having a plate hingedly connected to the receiver such that upon rotation of the first sidewall toward the floor, the end fits into the receiver and the plate locks the shaft to secure the first sidewall to the floor.

7. The vehicle of claim 6, wherein the end of the pin defines a spherical shape.

8. The vehicle of claim 6, wherein the hinge assembly includes first and second hinges interconnecting the first sidewall and the headboard at upper and lower portions of the first sidewall and headboard, wherein the first and second hinges effectuate rotation of the first sidewall.

9. The vehicle of claim 8, wherein the hinge assembly further includes a hinge check disposed between the first and second hinges at a middle portion of the headboard, the hinge check being configured to limit an angle of rotation of the first sidewall from the headboard.

10. The vehicle of claim 9, wherein the hinge assembly further includes a spacer disposed at the middle portion and in-line with the hinge check to control a distance between the first and second hinges.

* * * * *